Patented Mar. 17, 1942

2,276,860

UNITED STATES PATENT OFFICE 2,276,860

DYESTUFF OF THE PHTHALOCYANINE SERIES

Georg Niemann, Willi Schmidt, Fritz Muehlbauer and Georg Wiest, Ludwigshafen-on-the-Rhine, Germany, assignors to General Aniline & Film Corporation, a corporation of Delaware No Drawing. Application December 10, 1936, Serial No. 115,194. In Germany December 19, 1935

7 Claims. (Cl. 260—314)

The present invention relates to dyestuffs of the phthalocyanine series and a process for producing them.

We have found that valuable dyestuffs are obtained by treating dyestuffs of the phthalocyanine series with halogenating agents.

As halogenating agents, not only the halogens themselves but also any known halogenating agents may be used, for example phosgene, phosphorus pentachloride, phosphorus oxychloride, thionylchloride or sulphuryl chloride.

A great variety of dyestuffs of the phthalocyanine series free from metal or containing metal may be used as initial materials. The following dyestuffs may be mentioned by way of example. The metal-free phthalocyanine; the copper, nickel, aluminium, chromium, tin and zinc phthalocyanine, phthalocyanines prepared from substitution products of phthalodinitrile; the phthalocyanines obtainable from 3,4-di-cyandiphenyl or 1,2-dicyannaphthalene. The reaction is generally speaking carried out at elevated temperature, for example between 50° and 260°, preferably between 140° and 220° C., and preferably in the presence of a diluent.

A specially advantageous method of working consists in carrying out the reaction under superatmospheric pressure. This kind of operation is inter alia distinguished by a high velocity of the reaction and offers the further advantage that it proceeds at relatively lower temperatures than without the use of pressure. It is of special value for the preparation of highly halogenated dyestuffs and for the use of low boiling diluents and/or of low boiling halogenating agents. Derivatives of high boiling point of aromatic hydrocarbons and halogen fatty acids, are however, also suitable as diluents. Mixtures of such diluents may also be employed.

Furthermore, melts consisting of anhydrous aluminium halides and alkali metal halides may be used as diluents. As diluents which are especially suitable for working under superatmospheric pressure, there may be mentioned chloroform, carbon tetrachloride, acetonitrile, propionitrile and sulphur dioxide. The starting colored material may also be mixed with inorganic salts or oxides which remain solid at the reaction temperature such as salts of alkali or alkaline earth metals or oxides of aluminium, titanium or silicon. In some cases an excess of the halogenating agent may also serve as diluent as for example sulphuryl chloride. Mixtures of the said solvents or liquid diluent may likewise be used.

The halogenation may preferably be carried out while adding a halogen transferrer, such as iodine, iron, copper, antimony and its sulphides, aluminium or tin. Metals or metal compounds which act in part as halogen transferrers and may also in part enter into the dyestuff are especially suitable for this purpose. Such an addition has an especially favorable action for the conversion of the dyestuffs free from metals into dyestuffs which simultaneously contain metal and halogen. In some cases phthalocyanines which already contain metal may be converted in this way into others in which the metal already present has been wholly or partially replaced by the new metal or which contain in addition to the metal already present the metal which has been added as such or in the form of a compound during the halogenation. As suitable metal compounds may be mentioned for example salts, as for example halides, of iron, zinc and aluminium, and salts of nickel, cobalt, manganese and copper. By varying the reaction conditions, it is possible to prepare dyestuffs having different halogen contents. In some cases it is also possible by using more than one halogenating agent to obtain dyestuffs which contain different halogens in the molecule.

If it is desired to use easily volatile halogenating agents it is preferable to carry out the reaction under relatively high pressure. This method offers the advantage to give especially good yields. The chlorination, for example, may be effected at a pressure of between 10 and 100 atmospheres but even higher pressures may be used. In order to remove the hydrogen halide formed during the reaction the gases may be circulated, the hydrogen halide being absorbed in the usual manner at any desired part of the circle.

By the treatment with halogenating agents there is effected in almost every case a very desirable displacement of the shade of color of the dyestuffs towards green. In most cases dyestuffs are obtained which are soluble only with difficulty or are insoluble and which may be used in a manner similar to the known insoluble dyestuffs of the phthalocyanine series. They may also be incorporated as pigments with lacquers, plastic masses or artificial resins, precipitated on difficulty soluble solid substances, such as alumina or barium sulphate or used for the preparation of printing inks and printing varnishes. Finally they may also be converted in some cases into sulphonic acids by treatment with sulphonating agents.

The following examples will further illustrate how the said invention may be carried out in practice but the invention is not restricted to these examples. The parts are by weight.

Example 1

20 parts of a dyestuff which has been obtained in known manner by heating phthalodinitrile in the presence of copper compounds are suspended in 300 parts of anhydrous trichloracetic acid. By heating the suspension to from 130° to 140° C., the dyestuff passes partially into solution. Into this solution chlorine is then led at the said temperature for some hours. Streams of hydrogen chloride are thus evolved and the liquid finally solidifies to a solid mass. This is introduced into water and the precipitated dyestuff is filtered off by suction. It may be purified for example by dissolution in concentrated sulphuric acid and pouring the solution into ice-water. The dyestuff obtained, which contains about 8 atoms of chlorine in the molecule, is greener than the initial dyestuff.

Example 2

A suspension of 10 parts of the phthalocyanine free from metal, obtained for example by heating phthalodinitrile in the presence of sodium amylate, in 150 parts of anhydrous trichloracetic acid is heated at from 130° to 140° C. and the suspension treated at the said temperature for some hours with gaseous chlorine. The treatment is continued until the evolution of hydrogen chloride has subsided and the mixture has solidified to a solid mass. This is worked up in the manner described in Example 1. The dyestuff obtained in good yields differs from the initial dyestuff free from halogen by a clearly greener dyeing.

Instead of trichloracetic acid, dichloracetic acid or the mixture of di- and tri-chloracetic acids obtained in the commercial preparation of chloracetic acid may be used.

Example 3

A mixture of 15 parts of the dyestuff obtainable from phthalodinitrile in the presence of copper salts and 300 parts of anhydrous trichloracetic acid has added thereto at from 130° to 140° C. 16 parts of bromine. The dyestuff absorbs bromine with a vigorous evolution of hydrogen bromide. After some time, the suspension of the dyestuff containing bromine thus obtained is introduced into water, the resulting green-blue dyestuff is filtered off by suction and washed with hot water. It is preferably brought into paste form while still in the moist state.

Example 4

3 parts of anhydrous zinc chloride are introduced into a suspension of 15 parts of a phthalocyanine free from metal derived from phthalodinitrile in 300 parts of anhydrous trichloracetic acid and then 9 parts of bromine are allowed to drop in at about 130° C. After some time the acid liquid is separated off and the resulting green dyestuff containing zinc and bromine purified for example by precipitation from sulphuric acid. It is soluble in aniline or other amines.

Example 5

A solution of 28 parts of bromine in 100 parts of nitrobenzene is allowed to drop into a suspension of 20 parts of copper phthalocyanine and 10 parts of anhydrous zinc chloride in 300 parts of nitrobenzene at about 185° C. while stirring. The whole is then heated for about two hours at from 190° to 195° C., diluted with nitrobenzene as soon as hydrogen bromide no longer escapes and the dyestuff filtered off by suction, the nitrobenzene removed with alcohol or steam, the dyestuff boiled with water, filtered by suction and washed with water. The shade of color of the dyestuff has been clearly displaced towards green as compared with that of the initial dyestuff.

Example 6

5 parts of zinc chloride are added to a suspension, heated to about 185° C., of 20 parts of zinc phthalocyanine in 250 parts of nitrobenzene and a solution of 28 parts of bromine in 100 parts of nitrobenzene is then allowed to drop in slowly. The mixture is heated for from ½ to 2 hours at about 195° C., whereby streams of hydrogen bromide escape, and then diluted with nitrobenzene. The dyestuff is filtered off by suction and purified in the manner described in Example 5. The shade of color of the dyestuff is clearly greener than that of the initial dyestuff.

Other halides of zinc or halides of iron or of aluminium may be used instead of zinc chloride. Other dyestuffs of the phthalocyanine series containing metal may also be brominated in the said manner.

Example 7

A mixture of 20 parts of a phthalocyanine free from metal, 10 parts of anhydrous zinc chloride and 300 parts of nitrobenzene is heated to from 180° to 185° C. and a solution of 35 parts of bromine in 100 parts of nitrobenzene is allowed to drop slowly into the mixture while stirring. The mixture is then heated at about 190° C. until hydrogen halide no longer escapes. It is then diluted with nitrobenzene, the residue filtered by suction, the nitrobenzene removed by washing with alcohol and the remainder of the zinc chloride by washing with hot water. A brilliant green dyestuff containing bromine and zinc is thus obtained in a good yield. It is soluble in aniline and other amines and forms addition compounds therewith.

Example 8

A solution of 10 parts of anhydrous ferric chloride and 35 parts of bromine in 100 parts of nitrobenzene is slowly added to a suspension, heated to about 185° C., of 20 parts of a phthalocyanine free from metal in 300 parts of nitrobenzene. The mixture is then heated at from about 185° to 190° C., until hydrogen bromide no longer escapes. The resulting dyestuff is separated in the manner described in Example 7. It contains iron and halogen and has a deep green shade of color. The yield is 25 parts.

If, instead of zinc chloride, there are employed other metal compounds the metal of which is capable of entering into the dyestuff molecule, the corresponding dyestuffs containing metal and halogen are obtained.

Example 9

10 parts of metal-free phthalocyanine are suspended in 50 parts of nitrobenzene and after adding 5 parts of antimony trichloride and 1 part of iodine, the mixture is heated to boiling under reflux and chlorine is led through, the mixture being irradiated by the light of mercury vapor. After 6 hours the dyestuff formed is filtered off by suction and boiled with alcohol, hydrochloric acid, dilute alkali and acetone. A blue-green dyestuff which contains chlorine is thus obtained.

Instead of nitrobenzene ortho-dinitrobenzene or ortho-chlornitrobenzene may also be used.

Example 10

An intimate mixture of 100 parts of anhydrous aluminium chloride, 20 parts of sodium chloride and 20 parts of copper phthalocyanine is heated at 150° C., gaseous chlorine being led into the melt for 5 hours while stirring at a pressure of between 3 and 5 atmospheres. After cooling the mixture is treated with hot dilute hydrochloric acid and the dyestuff is boiled with a hot dilute solution of sodium carbonate and with acetone. 26 parts of a blue-green dyestuff which contains chlorine are thus obtained.

Example 11

A mixture of 150 parts of the mixture, resulting as a by-product during the preparation of trichloroacetic acid, consisting of acetic acids having a minor degree of halogenation, and 40 parts of phosphorus trichloride is heated at about 100° C. for 3 hours. Then, after introducing 20 parts of copper-phthalocyanine, chlorine is led into the mixture at 130° C. for 4 hours, the mixture is diluted with water, the precipitated dyestuff is filtered off by suction and purified in the usual manner. 28 parts of a blue-green dyestuff are thus obtained.

The mixture resulting as a by-product during the preparation of trichloro acetic acid mentioned above may also be used, without the addition of phosphorus trichloride, as diluent. It may also be mixed with thionyl chloride instead of phosphorus trichloride and serve as diluent in this form.

Example 12

Chlorine is led into a solution of 20 parts of copper-phthalocyanine and 1 part of iodine in 200 parts of 30 per cent fuming sulphuric acid at 70° C. for 4 hours. After cooling the mixture is poured onto ice and the blue-green dyestuff which precipitates is filtered off by suction. The dyestuff contains chlorine and sulphonic groups.

Example 13

20 parts of copper-phthalocyanine, 100 parts of anhydrous aluminium chloride and 20 parts of sodium chloride are intimately triturated with each other. After heating the mixture to 150° C., 50 parts of bromine are dropped into the melt, whereupon, after leading chlorine in for 5 hours, the melt is poured onto ice, the precipitated dyestuff is boiled with dilute hydrochloric acid, treated with a dilute solution of sodium carbonate and washed with water and methanol. Thus 48 parts of a green copper-phthalocyanine are obtained which contains in the molecule about 6 atoms of chlorine and 8 atoms of bromine.

Example 14

A solution of 2.1 parts of bromine in 10 parts of nitrobenzene is added to a mixture of 2.6 parts of the tetraphenyl-(4)-copper-phthalocyanine from 3,4-dicyandiphenyl and cuprous chloride, 53 parts of dry nitrobenzene and 0.5 part of iodine. The mixture is then heated at from 190° to 195° C. for 1 hour and the nitrobenzene is removed by means of steam. 3.2 parts of a dyestuff are thus obtained which according to analysis contains 24 per cent of bromine, i. e. about 4 atoms of bromine per molecule. The sulphonated dyestuff dissolves in sulphuric acid monohydrate giving a red-brown coloration.

Example 15

A mixture of 150 parts of copper-phthalocyanine, 1 part of anhydrous iron chloride and 1 part of iodine is treated with 170 parts of chlorine for 12 hours at 100° C. in a pressure-tight vessel. A pressure of 50 atmospheres is thus set up. The excess of chlorine and the hydrogen chloride formed are then allowed to escape and the resulting dyestuff is purified while hot by washing with acetone, water, dilute sulphuric acid and sodium carbonate solution. 175 parts of a phthalocyanine containing chlorine are thus obtained. The dyestuff has a brilliant color the shade of which is displaced towards green as compared with the initial dyestuff and it contains about 4 atoms of chlorine in the molecule.

Example 16

A mixture of 500 parts of copper-phthalocyanine, 10 parts of iodine and 10 parts of anhydrous iron chloride is treated in a pressure-tight vessel with 1600 parts of chlorine for 12 hours at 100° C. whereby a final pressure of 94 atmospheres is set up. The crude dyestuff is then worked up in the manner described in Example 1 and 700 parts of a green dyestuff are obtained the analysis of which shows that about 14 hydrogen atoms of the initial dyestuff have been replaced by chlorine.

Example 17

17 parts of chlorine are allowed to act for 12 hours on 5 parts of copper-phthalocyanine at 100° C. in a pressure-tight vessel. The hydrogen chloride formed is then allowed to escape and the crude dyestuff, obtained in the form of a green powder, is worked up in the manner described in Example 15. The dyestuff containing chlorine and copper thus obtained is green and contains about 14 atoms of chlorine in the molecule.

Example 18

A mixture of 250 parts of copper-phthalocyanine, 1 part of anhydrous iron chloride, 1 part of iodine and 1300 parts of bromine is heated at 100° C. in a pressure-tight vessel for 12 hours the pressure being about 10 atmospheres. The product is worked up in the above manner. A blue-green dyestuff containing about 6 atoms of bromine is thus obtained the shade of color of which is displaced towards green as compared with the initial dyestuff.

Example 19

A mixture of 500 parts of copper-phthalocyanine, 10 parts of antimony trichloride and 1700 parts of chlorine is heated at 100° C. under superatmospheric pressure for 2 hours. The crude dyestuff is purified as described in Example 15. It is a green phthalocyanine chloride and copper and it contains 14 atoms of chlorine in the molecule.

Example 20

A mixture of copper phthalocyanine and antimony trichloride is treated in the manner described in Example 19 with 1700 parts of chlorine for 10 minutes at 100° C. The resulting dyestuff contains about 8 atoms of chlorine in the molecule.

Example 21

A mixture of 250 parts of the olive-green dyestuff obtainable by heating at 130° C. phthalodrinitrile with naphthoquinone in the presence of anhydrous aluminium chloride, 1 part of anhydrous iron chloride, 1 part of iodine and 800 parts of chlorine is heated at 70° C. for 6 hours in a pressure-tight vessel. During the reaction the pressure rises up to 42 atmospheres. After working up in the manner described in the foregoing examples, a brown dyestuff containing chlorine is obtained. It dissolves in concentrated sulphuric acid and is precipitated therefrom in the form of brown flocks by dilution with water.

*Example 22*

700 parts of copper-phthalocyanine are ground with 4800 parts of potassium bromide, 1 part of anhydrous iron chloride and 1 part of iodine. The mixture is then treated in a pressure-tight vessel for 5 hours with 1700 parts of chlorine at 100° C. the pressure being 28 atmospheres. The resulting dyestuff is extracted with water and purified in the manner described in Example 1. A dyestuff containing bromine and chlorine is thus obtained which has a vivid green shade of color.

*Example 23*

A mixture of 50 parts of copper-phthalocyanine, 5 parts of cuprous chloride and 170 parts of chlorine is heated in a pressure-tight vessel for 12 hours at 60° C. the pressure rising up to 56 atmospheres. After working up in the manner described in Example 15, a green phthalocyanine containing chlorine and copper is obtained.

*Example 24*

1700 parts of chlorine are allowed to act under a pressure of 13 atmospheres for 20 hours at room temperature on a mixture of 250 parts of copper phthalocyanine, 1 part of anhydrous iron chloride and 1 part of iodine. A green-blue dyestuff containing chlorine and copper is thus obtained which contains 8 atoms of chlorine in the molecule.

*Example 25*

A mixture of 250 parts of copper-phthalocyanine, 500 parts of trichloracetic acid, 1 part of anhydrous iron chloride, 1 part of iodine and 800 parts of chlorine is heated under a pressure of about 21 atmospheres for 6 hours at 80° C. The resulting mixture is treated with water and the dyestuff is purified in the usual manner. A chlorinated copper-phthalocyanine is thus obtained which has a vivid green color.

*Example 26*

A mixture of 600 parts of phthalocyanine free from metal, 4500 parts of carbon tetrachloride, 20 parts of antimony trisulphide is treated for 4 hours at between 160° and 180° C. with 1500 parts of chlorine under superatmospheric pressure, the mixture then being worked up in the usual manner. The resulting chlorinated phthalocyanine is dark green and contains 14 atoms of chlorine in its molecule.

*Example 27*

A mixture of 500 parts of zinc phthalocyanine, 10 parts of anhydrous zinc chloride and 1700 parts of chlorine is heated in a pressure-tight vessel for 6 hours at 100° C. The resulting zinc-phthalocyanine containing chlorine is purified in the manner described in Example 15. It is dark green.

*Example 28*

A mixture of 250 parts of copper-phthalocyanine, 1 part of anhydrous iron chloride and 1000 parts of chlorine is heated for an hour at 230° C. under a pressure of between 30 and 40 atmospheres. The crude dyestuff is purified in the usual manner and a green copper phthalocyanine containing chlorine is thus obtained.

*Example 29*

A mixture of 300 parts of the partially brominated copper-phthalocyanine obtained according to Example 18, 1 part of iodine and 1 part of anhydrous iron chloride is heated with 1200 parts of chlorine for 6 hours under pressure at 100° C. After working up, a brilliant yellow-green copper phthalocyanine containing chlorine and bromine is obtained.

*Example 30*

70 parts of chlorine are allowed to act for one hour at 160° C. on a mixture of 25 parts of nickel-phthalocyanine, 100 parts f carbon tetrachloride and 1 part of antimony trichloride in a pressure-tight vessel. The dyestuff is purified in the usual manner. It is a dark green nickel-phthalocyanine containing chlorine.

*Example 31*

A mixture of 25 parts of aluminium phthalocyanine, 100 parts of chloroform, 3 parts of iodine and 70 parts of chlorine is heated in a closed vessel for one hour at 60° C., and then worked up in the usual manner. The purified dyestuff is pale green and is an aluminium-phthalocyanine containing chlorine.

*Example 32*

An intimate mixture of 5 parts of nickel-phthalocyanine and 5 parts of a mixture of titanium dioxide and barium sulphate is treated with 15 parts of chlorine for 3 hours at 100° C. under pressure. After working up, a chlorinated nickel-phthalocyanine is obtained in admixture with titanium dioxide and barium sulphate.

*Example 33*

A mixture of 50 parts of copper-phthalocyanine, 1 part of antimony trisulphide, 200 parts of carbon tetrachloride and 110 parts of chlorine is heated at a pressure of about 150 atmospheres for 4 hours at from 160° to 180° C. in a closed vessel. The dyestuff obtained is worked up in the usual manner. It contains copper and between 14 and 15 atoms of chlorine and has a green coloration.

*Example 34*

A mixture of 7 parts of copper-phthalocyanine, 10 parts of thionyl chloride and 17 parts of chlorine is heated in a pressure-tight vessel at 100° C. for 2 hours. The reaction mixture is then worked up in the usual manner and a green copper-phthalocyanine is obtained which contains chlorine.

*Example 35*

5 parts of copper-phthalocyanine are caused to react in a pressure-tight vessel with 10 parts of sulphur dioxide and 17 parts of chlorine at about 100° C. for 2 hours. The mass thus obtained is then worked up in the manner described in Example 15, whereby a brilliant-green dyestuff containing chlorine is obtained.

Example 36

70 parts of chlorine are caused to act at 140° C. for 2 hours under pressure on a mixture of 25 parts of metal-free phthalocyanine and 25 parts of cuprous chloride. A blue-green dyestuff is thus obtained which contains chlorine and copper.

Example 37

A solution of 11 parts of bromine in 30 parts of phosphorus oxychloride is added to 10 parts of copper-phthalocyanine, part of the dyestuff passing into solution already at room temperature giving a green solution. The reaction is completed by heating the mixture at about 175° C. for some hours in a closed vessel. The mass thus obtained is then entered into water, the aqueous liquid is boiled for some time, whereupon the dyestuff is filtered off by suction and washed with water and alcohol. The yield amounts to about 15 parts. The dyestuff contains about 4 atoms of bromine per molecule. Its shade of color, in comparison with that of the dyestuff which is free from bromine, is distinctly displaced towards green. It may be dispersed by any known method.

The reaction may also be carried out in the presence of 5 parts of zinc chloride. Instead of copper-phthalocyanine other metal-phthalocyanines may also be brominated in the said manner. The amount of the halogen to be introduced may be varied in any desired way by suitable choice of the reaction conditions, viz. the amount of bromine employed, the temperature and the reaction period.

Example 38

A mixture of 25 parts of a mixture consisting of the sodium salt of copper-phthalocyanine-trisulphonic acid and anhydrous Glauber's salt (ratio 1:2), and 40 parts of phosphorus oxychloride is heated for some time at 125° C. in a closed vessel. Then the mixture is allowed to cool and the mass obtained is introduced into water. The insoluble dyestuff formed is filtered off by suction, washed with water, dilute ammonia and again with water. It may be brought into a state of fine dispersion by the usual manner, as for example by redissolving it from concentrated sulphuric acid or by grinding. The dyestuff is blue-green and contains chlorine and probably also sulphonic acid or —$SO_2Cl$— groups.

If the said initial mixture be heated at 175° C. for some time in a closed vessel and the mass obtained be worked up in the manner described above a brilliant green dyestuff is obtained which is completely insoluble in water, acids and alkaline solvents and which contains from 13 to 14 atoms of chloride per molecule, but no sulphur.

The same dyestuff is obtained if, instead of 40 parts of phosphorus oxychloride, a mixture of 30 parts of phosphorus oxychloride and 10 parts of phosphorus pentachloride be used.

Example 39

20 parts of thionyl chloride are allowed to act at 200° C. for several hours in a closed vessel on 10 parts of a mixture of the sodium salt of copper-phthalocyanine-trisulphonic acid and anhydrous sodium sulphate (ratio 1:2). The mixture is then allowed to cool, any excess of thionyl chloride is removed under reduced pressure, the residue is introduced into water, the dyestuff formed filtered off by suction, washed with ammonia and water and dried. It has a faint bluish green coloration and contains 10 atoms of chlorine per molecule and a sulphonic acid group.

What we claim is:

1. A coloring matter of the phthalocyanine series containing more than 8 halogen atoms per molecule, and being substantially identical with the compound obtained by subjecting a coloring matter of the phthalocyanine series to halogenation by the aid of a halogenating agent selected from the group consisting of chlorinating agents and brominating agents.

2. In the process of chlorinating copper-phthalocyanine the improvement which comprises effecting the chlorination in the presence of copper chloride.

3. A copper phthalocyanine containing more than eight halogen atoms per molecule obtained by subjecting copper phthalocyanine to halogenation by the aid of a halogenating agent selected from the group consisting of chlorinating agents and brominating agents.

4. A copper phthalocyanine containing more than eight, but not over sixteen chlorine atoms per molecule, obtained by subjecting copper phthalocyanine to chlorination.

5. A copper phthalocyanine containing fourteen chlorine atoms per molecule obtained by subjecting copper phthalocyanine to chlorination.

6. Nickel phthalocyanine containing fourteen chlorine atoms per molecule obtained by subjecting nickel phthalocyanine to chlorination.

7. A metal-free phthalocyanine containing fourteen chlorine atoms per molecule obtained by subjecting a metal-free phthalocyanine to chlorination.

GEORG NIEMANN.
WILLI SCHMIDT.
FRITZ MUEHLBAUER.
GEORG WIEST.